United States Patent [19]

Smith

[11] Patent Number: 5,298,878
[45] Date of Patent: Mar. 29, 1994

[54] ANTI-CAR JACKING DEVICE

[76] Inventor: Lorenzo L. Smith, 1309 D. St., Woodbridge, Va. 22191

[21] Appl. No.: 970,138

[22] Filed: Nov. 2, 1992

[51] Int. Cl.$^5$ .............................................. B60R 25/10
[52] U.S. Cl. ................................... 340/426; 307/10.2; 340/430; 340/574
[58] Field of Search ............... 340/426, 428, 430, 434, 340/574, 541; 307/10.2, 10.3, 10.6; 180/287

[56] References Cited

U.S. PATENT DOCUMENTS

| | | |
|---|---|---|
| 2,022,725 | 12/1934 | Lazarus et al. |
| 2,892,181 | 6/1959 | Benson et al. |
| 3,242,460 | 3/1966 | Morrell. |
| 3,639,897 | 2/1972 | Teich ................................ 340/430 |
| 3,656,100 | 4/1972 | Beltrami ............................ 340/430 |
| 4,300,495 | 11/1981 | Trevino et al. |
| 4,301,441 | 11/1981 | Baxter .............................. 340/426 |
| 4,485,887 | 12/1984 | Morano. |
| 4,841,277 | 6/1989 | Wilson ............................. 340/426 |
| 4,857,888 | 8/1989 | Torres .............................. 340/426 |
| 5,182,541 | 1/1993 | Bajorek et al. ................... 340/541 |

FOREIGN PATENT DOCUMENTS

| | | | |
|---|---|---|---|
| 0088709 | 9/1983 | European Pat. Off. | 340/426 |
| 0146328 | 6/1985 | European Pat. Off. | 340/426 |
| 8905018 | 6/1989 | World Int. Prop. O. | 340/426 |

*Primary Examiner*—Brent Swarthout
*Attorney, Agent, or Firm*—Richard C. Litman

[57] ABSTRACT

A vehicle anti-theft device disengages the ignition of the vehicles in which it is installed after a predetermined time has elapsed after a foot switch is pressed with the ignition system on. After a second period of time after the foot switch is pressed a horn is activated and tear gas is dispensed through the ventilation system of the vehicle into the passenger compartment.

1 Claim, 1 Drawing Sheet

ANTI-CAR JACKING DEVICE

BACKGROUND OF THE INVENTION

1. FIELD OF THE INVENTION

The present invention relates to those devices designed to discourage and prevent the theft of automobiles. More particularly, the present invention pertains to those devices designed to shut the engine off after a predetermined amount of time has elapsed since the device was actuated. Furthermore, the device of the present invention sounds a horn and dispenses tear gas through the ventilation ducts of the automobile after a second predetermined amount of time has elapsed.

2. DESCRIPTION OF THE PRIOR ART

Devices designed to prevent and/or discourage the theft of automobiles have used hidden switches to activate a timer. The timer disables the engine after a set amount of time has elapsed. Alarms, locks, or other mechanisms of the car may be activated as well.

U.S. Pat. No. 2,022,725 issued Dec. 23, 1934 to Alexander Lazarus et al discloses a theft prevention device using a hidden switch to cut off the fuel supply when activated.

U.S. Pat. No. 2,892,181 issued Jun. 23, 1959 to Ralph A. Benson et al discloses an anti-theft device which disables the ignition system of the car after a set amount of time has elapsed. A horn is also activated at that time.

U.S. Pat. No. 3,242,460 issued Mar. 22, 1966 to Benjamin A. Morrell discloses an automobile alarm system in which the thief is locked inside the vehicle while the horn and visual alarms are activated. The vehicle can be driven only a short distance before the ignition system is disabled.

U.S. Pat. No. 4,300,495 issued Nov. 17, 1981 to Carlos S. Trevino et al and U.S. Pat. No. 4,485,887 issued Dec. 4, 1984 to Michael W. Morano disclose time delay circuits for disabling the ignition system if a switch is not activated.

None of the above inventions and patents, taken either singly or in combination, is seen to describe the instant invention as claimed.

SUMMARY OF THE INVENTION

Accordingly, it is a principal object of the invention to disable the ignition system of a vehicle after a predetermined amount of time has elapsed subsequent to a manual switch being activated by the operator of the vehicle in the event that the operator is forcibly removed from his/her vehicle by a thief.

It is another object of the invention to locate the manual switch on the floor of the vehicle.

It is a further object of the invention to activate a visual alarm indicating that the vehicle is stolen as soon as the manual switch is activated.

Still another object of the invention is to activate an audio alarm and tear gas to disable the thief in accordance with a second timer.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
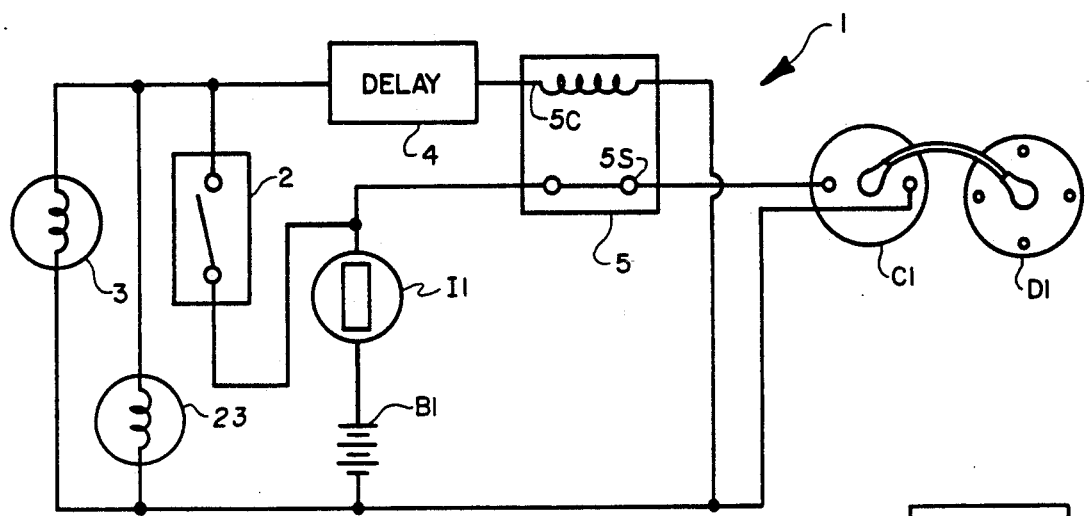
FIG. 1 is a block diagram of a first embodiment of the present invention.

As shown in FIG. 1, an anti-theft device 1 has an ignition switch 11 connected to a car battery B1 to energize an ignition coil C1. A distributor D1 is used to provide a spark to the plugs of the vehicle. The elements I1, B1, C1, and D1 are part of most conventional automobiles. A foot switch 2 located on the floor of the passenger compartment on the driver's side, as illustrated by the patent to Lazarus et al made of record and incorporated herein by reference, is used to activate a relay 5. The relay 5 is used to open the path between the hot wire of the ignition switch I1 and the ignition coil C1 when activated. The relay 5 is activated when relay coil 5C is energized, thereby opening relay switch 5S. A conventional delay circuit 4 delays the activation of the relay 5 for a predetermined amount of time after the foot switch 2 is closed with the ignition switch I1 on, for example three to five minutes. Upon closing the foot switch 2 with the ignition switch I1 on, a light 3 is activated to indicate that the vehicle has been stolen and a light 23 is activated to indicate to the driver that the foot switch 2 has been closed. The light 3 would be visible from outside the vehicle, but not from within the vehicle, as illustrated by the patent to Morrell made of record and incorporated herein by reference. The light 23 would be visible to the driver and could be located on the instrument panel, but would not be labeled so that the owner of the vehicle would know that the light indicates that the foot switch 2 has be closed but a thief would not. When the foot switch 2 is reopened, power to the relay 5 is shut off and the switch 5S of the relay 5 assumes its normal closed position.

Figure 2:
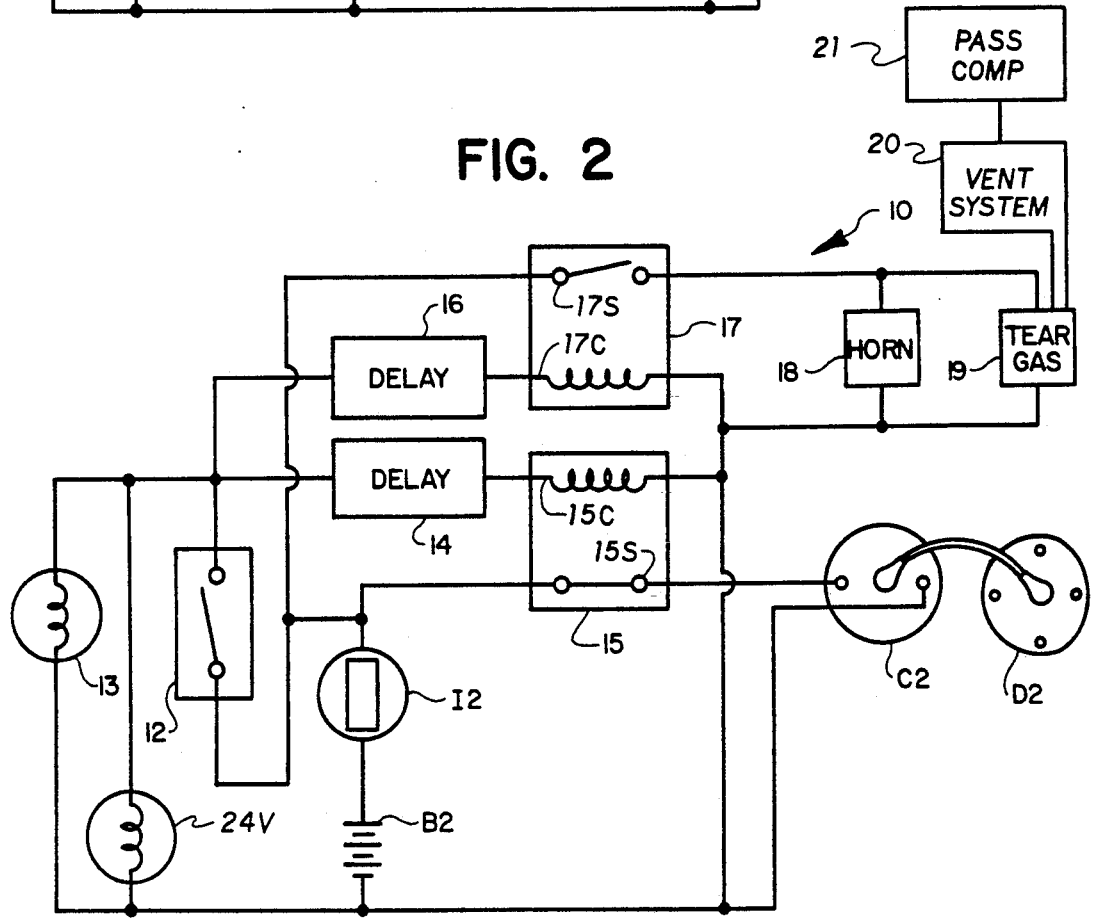
FIG. 2 is a block diagram of a second embodiment of the present invention.

The anti-theft device 10 as illustrated in FIG. 2 has an ignition switch I2, battery B2, ignition coil C2, and the distributor D2 which are conventionally found in most vehicles. A foot switch 12 is used to activate a relay 15. The relay 15 is activated when the relay coil 15C is energized so as to open the path between the hot wire of the ignition switch I2 and the ignition coil C2 by opening relay switch 15S. A conventional delay circuit 14 delays the activation of the relay 15 for a first predetermined amount of time after the foot switch 12, located on the floor of the passenger compartment on the driver's side, is closed with the ignition switch I2 on. Upon closing the foot switch 12 with the ignition switch I2 on, a light 13 is activated to indicate that the vehicle has been stolen and a light 24 is activated to indicate to the driver that the foot switch 12 is closed. The light 13 would be visible from outside the vehicle, but not from within the vehicle. The light 24 would be visible to the driver and could be located on the instrument panel, but would not be labeled so that the user of the vehicle would know that the light indicates that the foot switch 12 has been closed but a thief would not.

Upon closing the foot switch 12 with the ignition switch I2 on, a second delay timer 16 is also activated along with the delay 14. The delay 16 energizes the relay coil 17C so as to close the normally open switch 17S of the relay 17 after a second predetermined amount of time has lapsed from the time the foot switch 12 is initially closed with the ignition switch I2 on. The switch 17S supplies power from the ignition switch I2 to the horn 18 when closed. The horn 18 may be the same horn used by the vehicle or a separate horn to play back a recorded message, such as those used in the conventional PA system. The recorded message could announce that the vehicle has been stolen, e.g., "This vehicle is stolen" or the recorded message could be the recording of a horn blast. Alternatively, the recorded message could alternate messages, e.g. a horn blast followed by the announcement message. Also, power would be supplied to a tear gas system 19 which would spray tear gas through the ventilation system 20 of the automobile to the passenger compartment 21 of the automobile. This would disable the thief of the vehicle after the ignition system has been shut off and the car has had time to come to a complete stop.

It is to be understood that the present invention is not limited to the embodiments described above, but encompasses any and all embodiments within the scope of the following claims.

I claim:

1. A vehicle anti-theft device for use in a vehicle having an ignition switch for supplying positive voltage from an output of the ignition switch to an ignition coil, said vehicle anti-theft device comprising:

a manual switch having a first end and a second end, said first end being wired to the output of the ignition switch, said manual switch providing a connection to said second end thereof when said manual switch is closed;

a visual indicator for indicating that the vehicle associated therewith is stolen, said visual indicator having a connection to said second end of said manual switch to supply power thereto;

a first relay having a first relay coil and a first relay switch, said first relay coil opening said first relay switch when said first relay coil is energized, said first relay switch having a first connection thereof to the output of the ignition switch and a second connection thereof to the input of the ignition coil;

a first delay circuit having an input thereof connected to said second end of said manual switch for providing at an output thereof any voltage located at said input thereof after a first predetermined period of time has elapsed since a voltage is initially detected at said input thereof, wherein said first relay coil is energized when power is supplied thereto by a voltage level at an input thereof connected to said output of said first delay circuit;

whereby said first relay coil is energized after said first predetermined period of time has elapsed since said manual switch is initially closed with the ignition switch on, thereby opening said first relay switch and disabling the ignition coil of the vehicle for as long as said first relay coil remains energized;

a second relay having a second relay coil and a second relay switch, said second relay coil closing said second relay switch when said second relay coil is energized, said second relay switch having a first connection thereof to the output of the ignition switch to supply voltage to a second connection of said second relay switch when the ignition switch is on and said second relay switch is closed;

a second delay circuit having an input thereof connected to said second end of said manual switch for providing at an output thereof any voltage located at said input thereof after a second predetermined period of time has elapsed since a voltage is initially detected at said input thereof, wherein said second relay coil is energized when power is supplied thereto by a voltage level at an input thereof connected to said output of said second delay circuit;

a horn connected to said relay connection of said relay switch;

whereby said second relay coil is energized after said second predetermined amount of time has elapsed subsequent to said manual switch being initially closed, thereby closing said second relay switch and activating said horn for as long as said second relay coil remains energized; and means for dispensing tear gas, wherein said means for dispensing tear gas is connected to said second connection of said second relay switch for supplying power thereto and activating said means for dispensing tear gas, whereby said means for dispensing tear gas sprays tear gas through a ventilation system of the vehicle to the passenger compartment of the vehicle when activated.

* * * * *